(12) United States Patent
Yi et al.

(10) Patent No.: US 10,075,929 B2
(45) Date of Patent: Sep. 11, 2018

(54) METHOD AND APPARATUS FOR NETWORK SYNCHRONIZATION

(71) Applicant: LG Electronics Inc., Seoul (KR)

(72) Inventors: Yunjung Yi, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 62 days.

(21) Appl. No.: 14/910,222

(22) PCT Filed: Sep. 16, 2014

(86) PCT No.: PCT/KR2014/008628
§ 371 (c)(1),
(2) Date: Feb. 4, 2016

(87) PCT Pub. No.: WO2015/037970
PCT Pub. Date: Mar. 19, 2015

(65) Prior Publication Data
US 2016/0192304 A1 Jun. 30, 2016

Related U.S. Application Data

(60) Provisional application No. 61/897,808, filed on Oct. 30, 2013, provisional application No. 61/882,632, (Continued)

(51) Int. Cl.
*G08C 17/00* (2006.01)
*H04W 56/00* (2009.01)
(Continued)

(52) U.S. Cl.
CPC ........ *H04W 56/001* (2013.01); *H04B 7/2656* (2013.01); *H04B 7/2696* (2013.01);
(Continued)

(58) Field of Classification Search
CPC .................................................. H04B 7/2656
See application file for complete search history.

(56) References Cited

U.S. PATENT DOCUMENTS 7,002,948 B2 * 2/2006 Kato ................... H04B 7/2684
370/335
8,023,495 B1 * 9/2011 van Erven .......... H04W 56/001
370/345
(Continued)

FOREIGN PATENT DOCUMENTS

| CN | 102144423 A | 8/2011 |
|---|---|---|
| WO | 2012148236 | 11/2012 |
| WO | 2012163423 | 12/2012 |

OTHER PUBLICATIONS

Alcatel-Lucent et al., "Discussion of Small Cell Synchronization Methods," R1-132061, 3GPP TSG-RAN1 Meeting #73, May 20-24, 2013, see pp. 1-3.

*Primary Examiner* — Guang W Li
(74) *Attorney, Agent, or Firm* — Dentons US LLP

(57) ABSTRACT

A method and an apparatus for network synchronization are provided. The apparatus comprises a radio frequency (RF) unit for transmitting and receiving a radio signal and a processor operatively coupled to the RF unit, wherein the processor is configured for transmitting signals via the RF unit, wherein the processor performs network synchronization with neighboring cells.

14 Claims, 21 Drawing Sheets

Related U.S. Application Data filed on Sep. 26, 2013, provisional application No. 61/878,555, filed on Sep. 16, 2013.

(51) Int. Cl.
*H04B 7/26* (2006.01)
*H04J 11/00* (2006.01)
*H04W 52/02* (2009.01)

(52) U.S. Cl.
CPC ......... *H04J 11/00* (2013.01); *H04W 52/0206* (2013.01); *H04W 56/009* (2013.01); *H04W 56/0045* (2013.01); *H04J 2011/0096* (2013.01); *Y02D 70/00* (2018.01); *Y02D 70/1242* (2018.01); *Y02D 70/1262* (2018.01); *Y02D 70/1264* (2018.01); *Y02D 70/164* (2018.01); *Y02D 70/23* (2018.01); *Y02D 70/449* (2018.01)

(56) References Cited

U.S. PATENT DOCUMENTS

| | | | | |
|---|---|---|---|---|
| 8,134,938 B2* | 3/2012 | Yi | | H04W 56/001 370/254 |
| 8,743,748 B2* | 6/2014 | Pan | | H04W 56/0045 370/280 |
| 8,804,684 B2* | 8/2014 | Persson | | H04W 56/0045 370/328 |
| 8,937,938 B2* | 1/2015 | Kim | | H04W 56/00 370/350 |
| 8,948,294 B2* | 2/2015 | Han | | H04L 5/0007 370/210 |
| 9,648,573 B2* | 5/2017 | Siomina | | H04W 56/001 |
| 9,749,075 B2* | 8/2017 | Liao | | H04J 11/005 |
| 9,907,066 B2* | 2/2018 | Park | | H04W 72/042 |
| 9,961,654 B2* | 5/2018 | Yi | | H04W 56/001 |
| 2004/0032836 A1* | 2/2004 | Grilli | | H04B 7/2668 370/252 |
| 2008/0159258 A1* | 7/2008 | Ji | | H04B 7/2696 370/350 |
| 2010/0054237 A1* | 3/2010 | Han | | H04J 3/0638 370/350 |
| 2010/0215032 A1* | 8/2010 | Jalloul | | H04L 27/2655 370/350 |
| 2011/0171949 A1* | 7/2011 | Liao | | H04W 56/0015 455/422.1 |
| 2012/0236977 A1* | 9/2012 | Zou | | H04W 56/0015 375/354 |
| 2013/0094419 A1* | 4/2013 | Sumasu | | H04J 11/005 370/311 |
| 2013/0272229 A1* | 10/2013 | Dinan | | H04W 52/18 370/329 |
| 2013/0272231 A1* | 10/2013 | Dinan | | H04W 52/34 370/329 |
| 2014/0057637 A1* | 2/2014 | Hoang | | H04W 56/0045 455/445 |
| 2014/0274062 A1* | 9/2014 | Centonza | | H04W 24/10 455/437 |
| 2014/0334436 A1* | 11/2014 | Qu | | H04L 5/005 370/330 |
| 2015/0189610 A1* | 7/2015 | Siomina | | G01S 5/021 370/280 |
| 2017/0118753 A9* | 4/2017 | Dinan | | H04W 72/0446 |
| 2017/0135121 A1* | 5/2017 | Eyuboglu | | H04W 72/12 |

* cited by examiner

METHOD AND APPARATUS FOR NETWORK SYNCHRONIZATION

This application is a 35 U.S.C. § 371 National Stage of International Application No. PCT/KR2014/008628 filed on Sep. 16, 2014, and claims priority to U.S. Provisional Application Nos. 61/878,555 filed on Sep. 16, 2013; 61/882,632 filed on Sep. 26, 2013 and 61/897,808 filed on Oct. 30, 2013, all of which are hereby incorporated by reference in their entireties as if fully set forth herein.

TECHNICAL FIELD

This invention relates to wireless communication, more specifically to techniques for network synchronization for eNBs.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established where one CG can have multiple CCs. Each CC is defined by a single bandwidth and a center frequency.

A system in which data is transmitted and/or received in a broadband through a plurality of CCs is referred to as a multi-component carrier system (multi-CC system) or a CA environment. A system in which data is transmitted and/or received in a broadband through a plurality of CGs is referred to as a inter-node resource aggregation or dual connectivity environment. The multi-component carrier system and dual connectivity system perform both a narrow band and a broad band by using one or more carriers. For example, when an each carrier corresponds to a bandwidth of 20 MHz, a bandwidth of a maximum of 100 MHz may be supported by using five carriers.

In this circumstances, different types of cells are used for enhance the performance of wireless communication. For example, user equipment can transmits/receives signals with a plurality of eNB. In this case, network synchronization needs to be considered to enhance channel quality, etc.

SUMMARY OF INVENTION

Technical Problem

An object of the present invention is to provide method and apparatus for enhancing network synchronization for eNBs.

Another object of the present invention is to provide method and apparatus for network synchronization using source cell.

Another object of the present invention is to provide method and apparatus for signaling enhancement to support network synchronization with interface between eNBs.

Technical Solution

An embodiment of the present invention is an apparatus for network synchronization which comprises a radio frequency (RF) unit for transmitting and receiving a radio signal and a processor operatively coupled to the RF unit, wherein the processor is configured for transmitting signals via the RF unit, wherein the processor performs network synchronization with neighboring cells.

Another embodiment of the present invention is a method for network synchronization which comprises receiving signal from a user equipment and/or a cell, performing network synchronization with neighboring cells and transmitting signal to the user equipment and or the cell.

Advantageous Effects

According to the present invention, network synchronization for eNBs can be enhanced.

According to the present invention, network synchronization can be enhanced using source cell.

According to the present invention, network synchronization can be enhanced with interface between eNBs.

MODE FOR INVENTION

Figure 1:
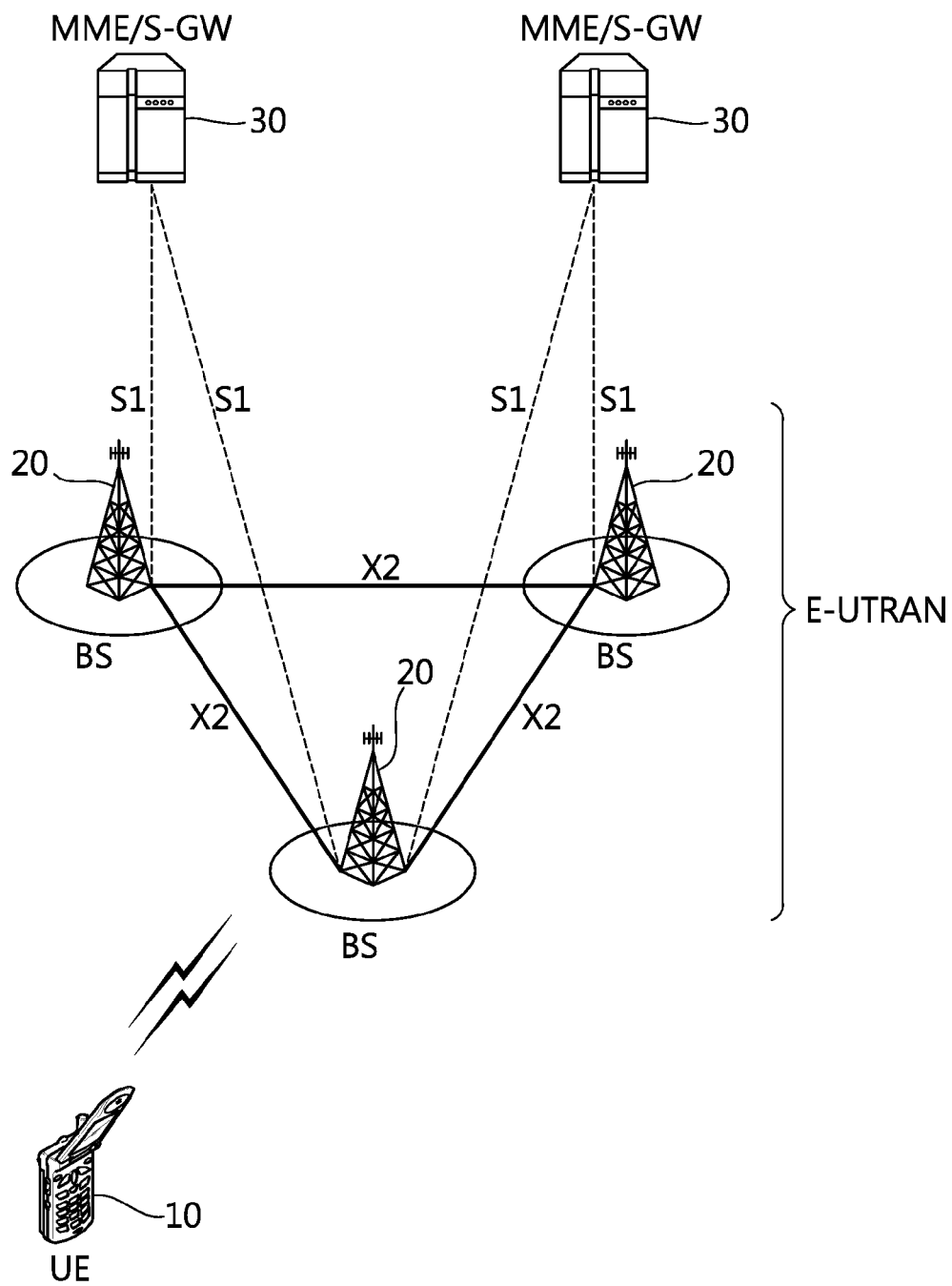
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
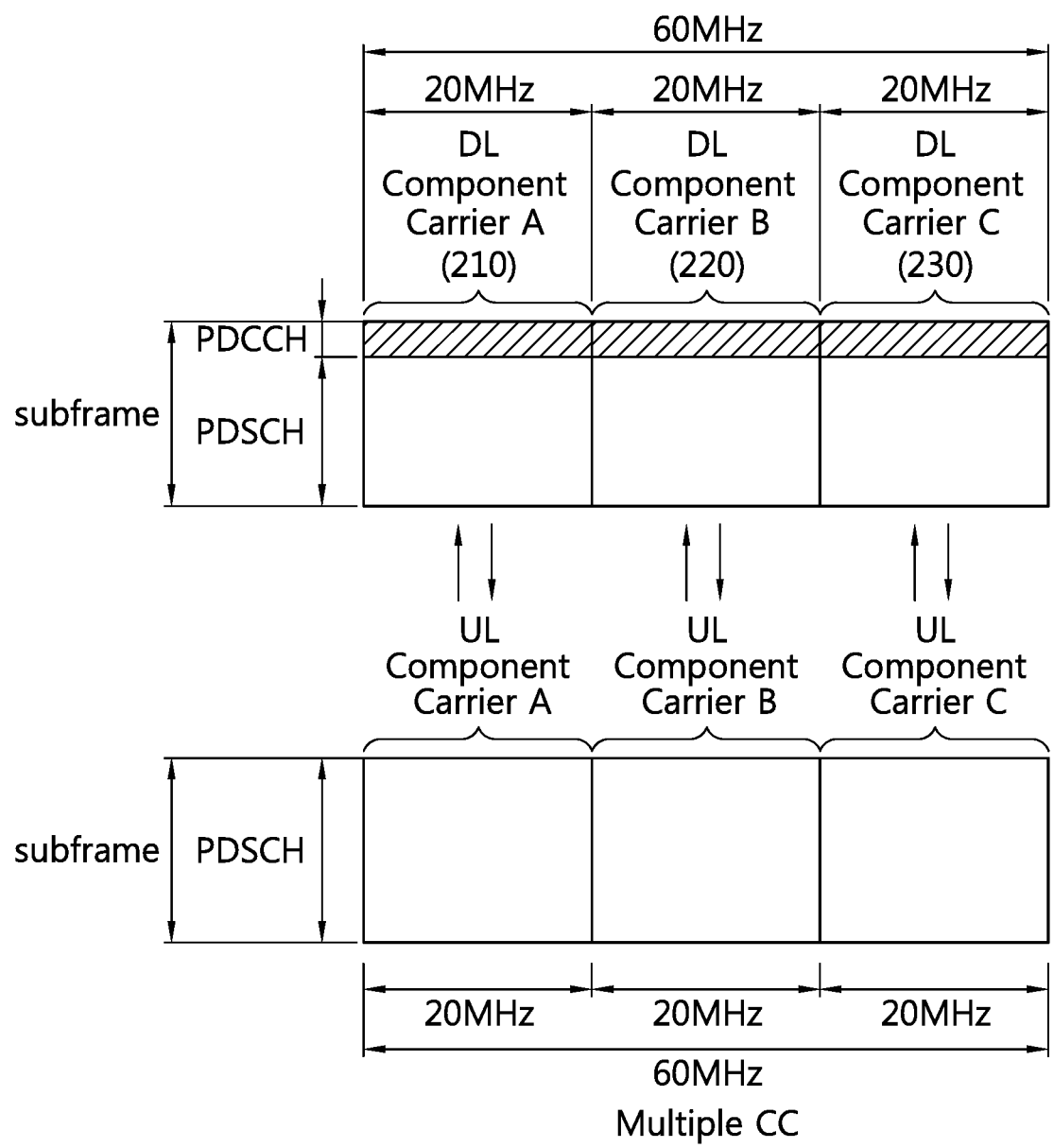
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
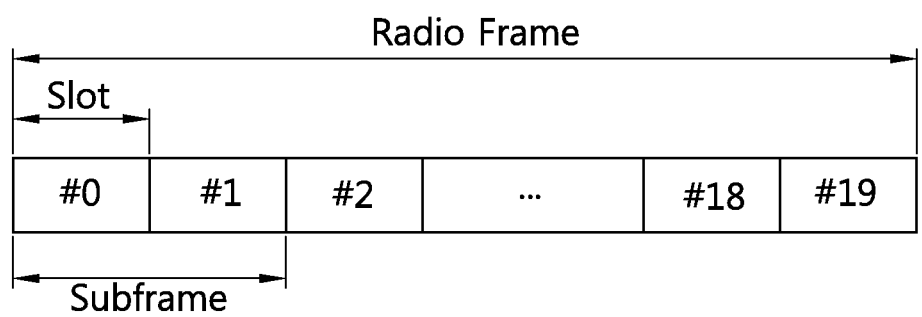
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. PUCCH format 3 can be used to enable the possibility of transmitting more than four bits in an efficient way, even though PUCCH format 3 also be used for transmitting less four bits of signal. The basis of PUCCH format 3 is DFT (Discrete Fourier Transform)-precoded OFDM. Up to five terminals may share the same resource-block pair for PUCCH format 3 when a length-5 orthogonal sequence is used with each of the five OFDM symbol carrying data in a slot being multiplied by one element of the sequence. A terminal (eNB and/or UE) can be configured with more than one resource (e.g. four different resources) for PUCCH format 3.

Figure 4:
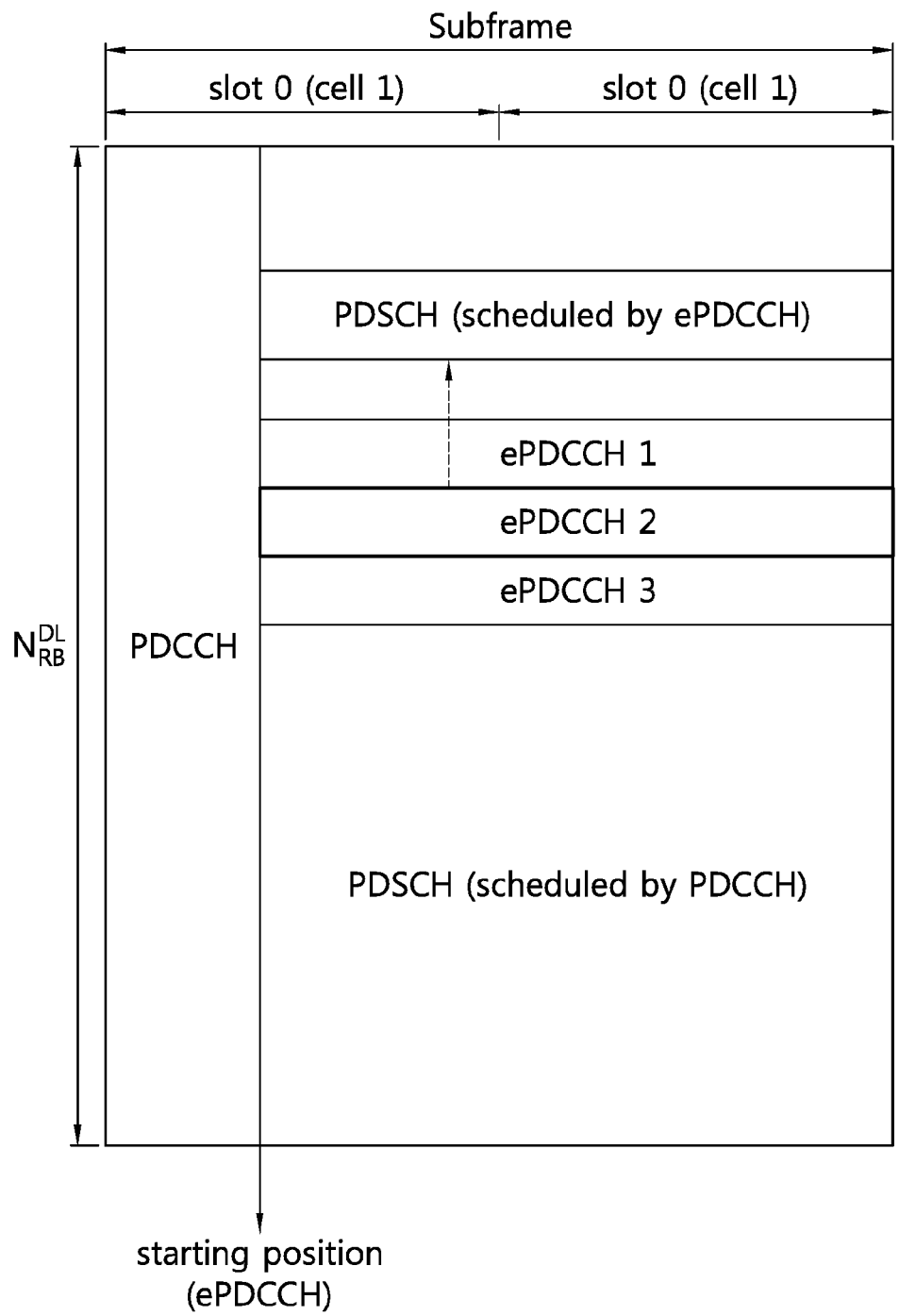
FIG. 4 shows downlink control channels to which the present invention is applied.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MB-SFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

Meanwhile, a UE may receive signals from more than one cell and transmit signals to more than one cell under some circumstances.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable.

Dual connectivity is an operation where a given UE consumes radio resources provided by at least two different network points (master eNB (MeNB) and secondary eNB (SeNB)) connected with non-ideal or ideal backhaul while UE is in RRC_CONNECTED mode.

Figure 5:
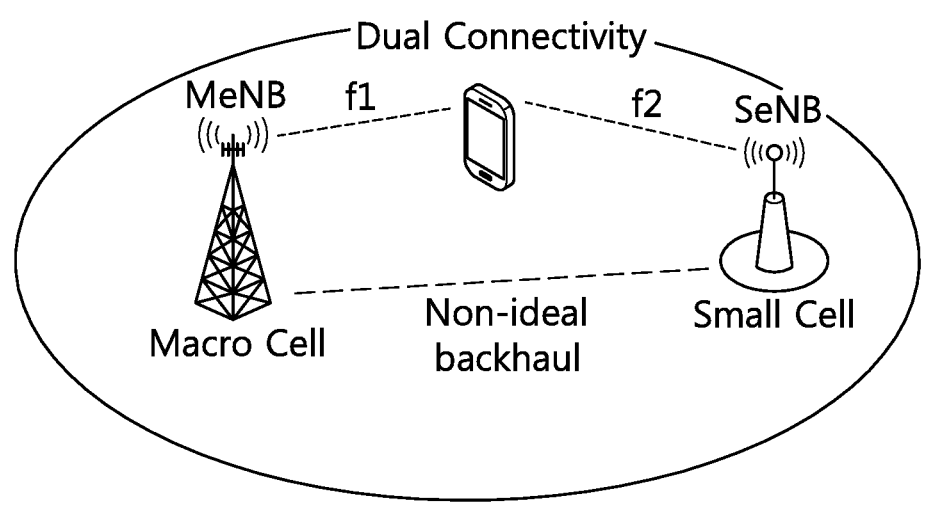
FIG. 5 shows an example of dual connectivity to a macro cell and a small cell.

FIG. 5 shows an example of dual connectivity to a macro cell and a small cell. Referring to FIG. 5, the UE is connected to both the macro cell and the small cell. A macro cell eNB serving the macro cell may be called as a MeNB in dual connectivity, and a small cell eNB serving the small cell may be called as a SeNB in dual connectivity.

The MeNB is an eNB which terminates at least S1-MME and therefore act as mobility anchor towards the core network (CN) in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE)

type traffic, while the MeNB may be responsible for transmitting other types of traffic such as VoIP, streaming data, or signaling data.

Figure 6:
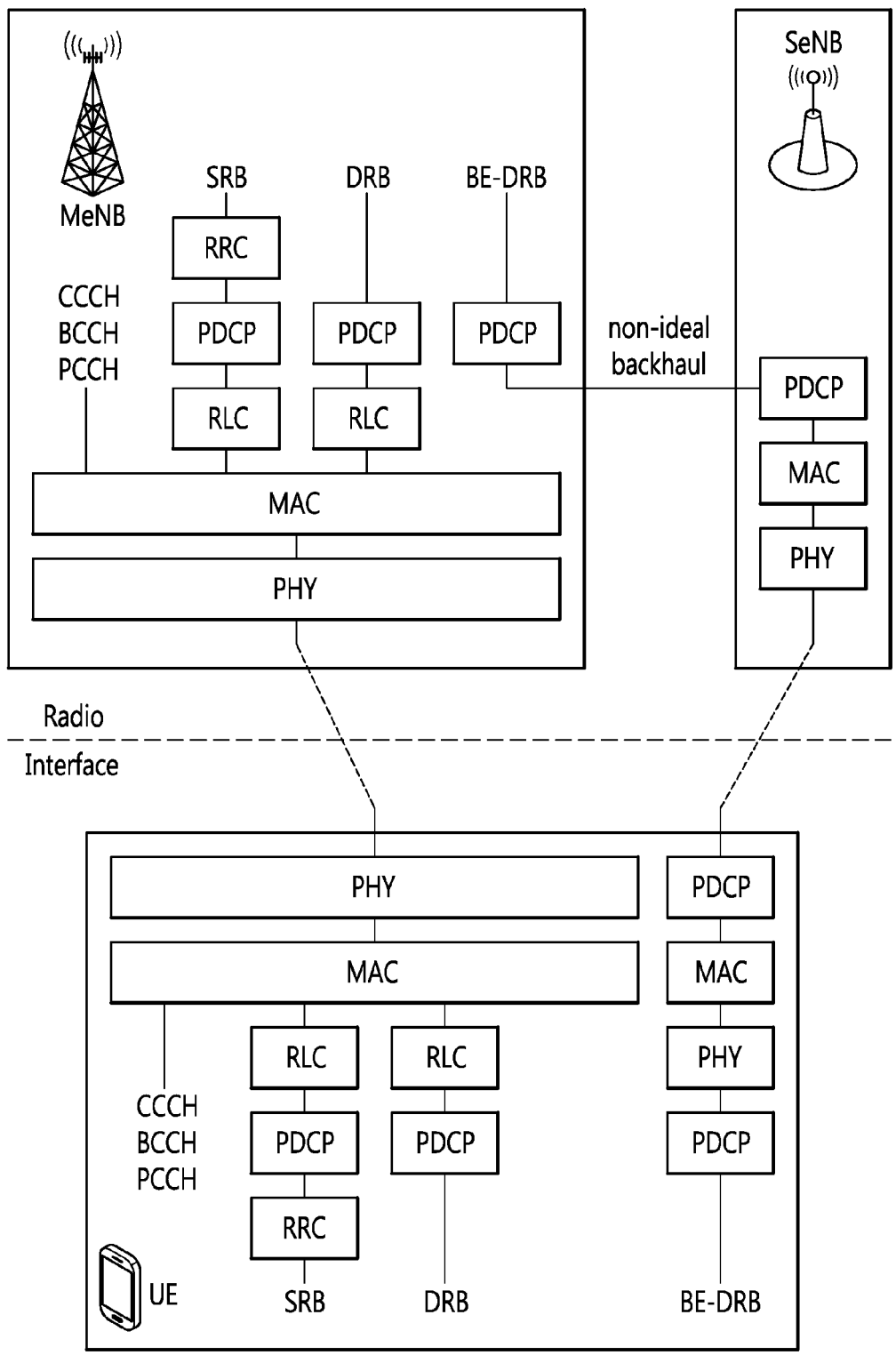
FIG. 6 shows an example of a protocol architecture supporting dual connectivity.

FIG. 6 shows an example of a protocol architecture supporting dual connectivity. To support dual connectivity, various protocol architectures have been studied.

Referring to FIG. 6, PDCP and RLC entities are located in different network nodes, i.e., PDCP entities in the MeNB and RLC entities in the SeNB. In the UE side, the protocol architecture is same as the prior art except that the MAC entity is setup for each eNB (i.e., the MeNB and SeNB).

In a small cell scenario, to support efficient Inter-cell interference coordination (ICIC), dual connectivity and other collaboration among cells, network synchronization among eNBs may be necessary. This invention(s) provides use cases and candidate synchronization techniques.

Network is synchronized to the absolute time. This may be achieved by GPS. For small cell scenarios, a few other cases of relaxing global synchronization requirements as follows: (1) Global synchronization within a macro coverage, (2) global synchronization within a small cell cluster, and (3) global synchronization within a range (such as 1 km) centered at a master node.

In the local network synchronization, networks are synchronized each other within synchronization accuracy requirement within two hops away.

Figure 7:
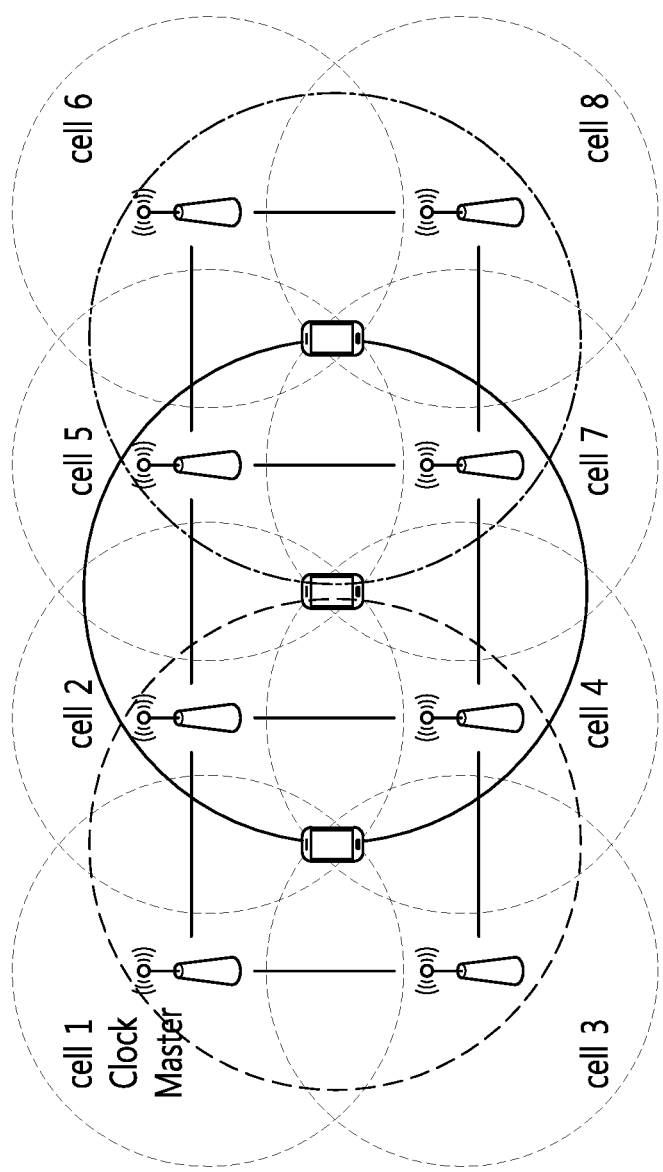
FIG. 7 describes an example of a local network synchronization scenario.

FIG. 7 describes an example of a local network synchronization scenario. As shown in FIG. 7, it is assumed that there are 8 cells and the connectivity among cells is shown in solid lines. By local network synchronization within two hops, each circle in the center should be target synchronization entity.

In other words, cell1, 2, 3 and 4 in FIG. 7 should be synchronized each other and cell 2, 5, 4, and 7 in FIG. 7 should be synchronized each other. In this case, it needs to define one or more clock masters which may be synchronized each other. The motivation of this synchronization is to align downlink reception timing at any UE served by small cells.

Figure 8:
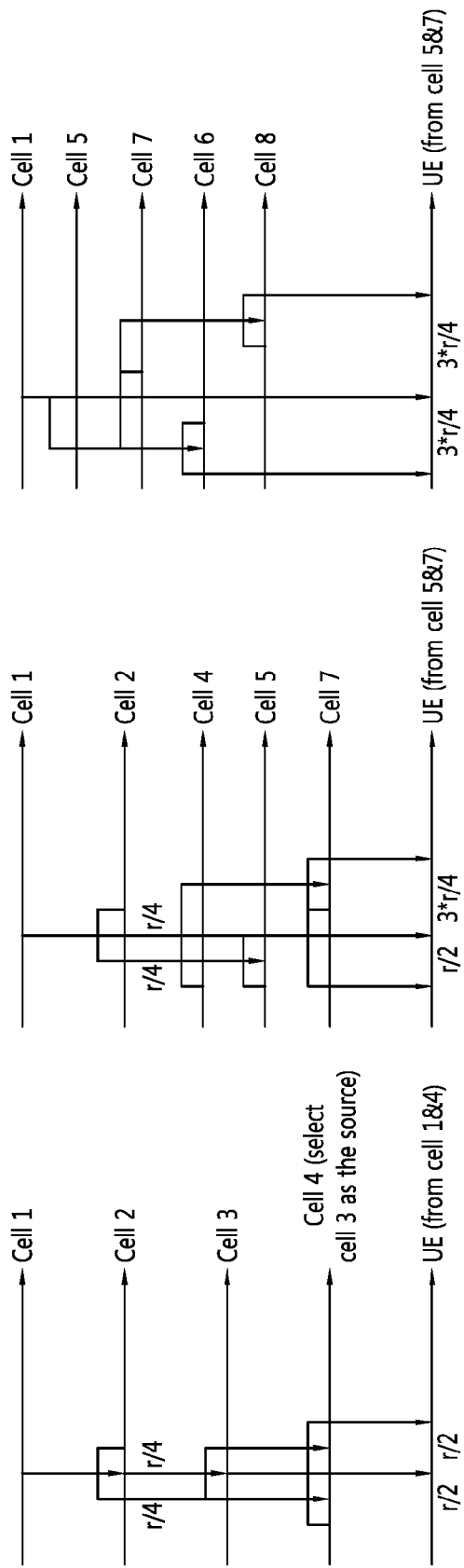
FIG. 8 describes briefly examples of network synchronization and UE reception timing difference.

Let's assume that cell1 is a clock master and the synchronization accuracy is r μs (i.e., synchronization of eNB transmission timing is aligned each other within ±r μs). To support two-hop away localization, each eNB should be synchronized with each other within ±r/4 μs, then from any UE perspective, downlink receptions from neighboring cells should be fall in within 2*r μs. Propagation delay between two eNBs is assumed to be zero for the simplicity. One example is shown in FIG. 8.

FIGS. 8(a), 8(b) and 8(c) describe briefly examples of network synchronization and UE reception timing difference. The schemes of FIGS. 8(a), 8(b) and 8(c) work only when the clock source is within three hops away from any eNB. Referring to the FIGS. 8(a), 8(b) and 8(c), the synchronization accuracy between neighbouring cells are propagated when the master clock is the cell1.

With consideration of cases on FIGS. 8(a), 8(b) and 8(c), network synchronization and some calibration may be needed between nodes directly connected or clock master should be present within two hops from any eNB.

This issue can be relaxed with macro-coverage and support from macro-cell. To select clock source, a eNB with GPS capable UE may claim itself as clock source. If there are not sufficient clock sources in the network, macro-cell or cluster head master may select a few nodes as clock sources which other small cell eNBs can use to perform network synchronization.

Figure 9:
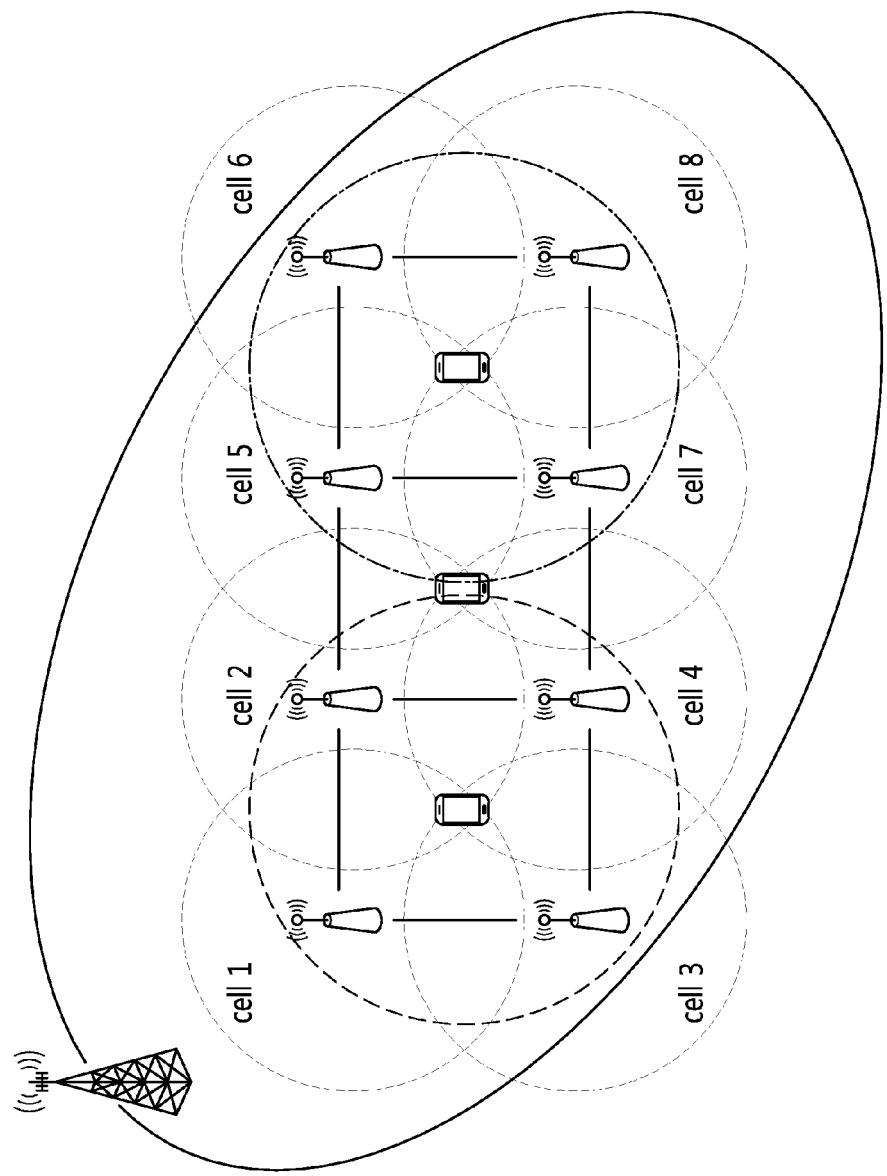
FIG. 9 briefly describes macro-assisted network synchronization.

FIG. 9 briefly describes macro-assisted network synchronization. Referring to FIG. 9, cells 1 to 9 are overlapped with macro cell. In this case, network synchronization between small cells (cells 1 to 9) can be assisted by macro cell. In other words, the network synchronization may be configured based on the signal from the macro cell.

In terms of making network synchronization based on signals from macro cell, two approaches may be considered.

Figure 10:
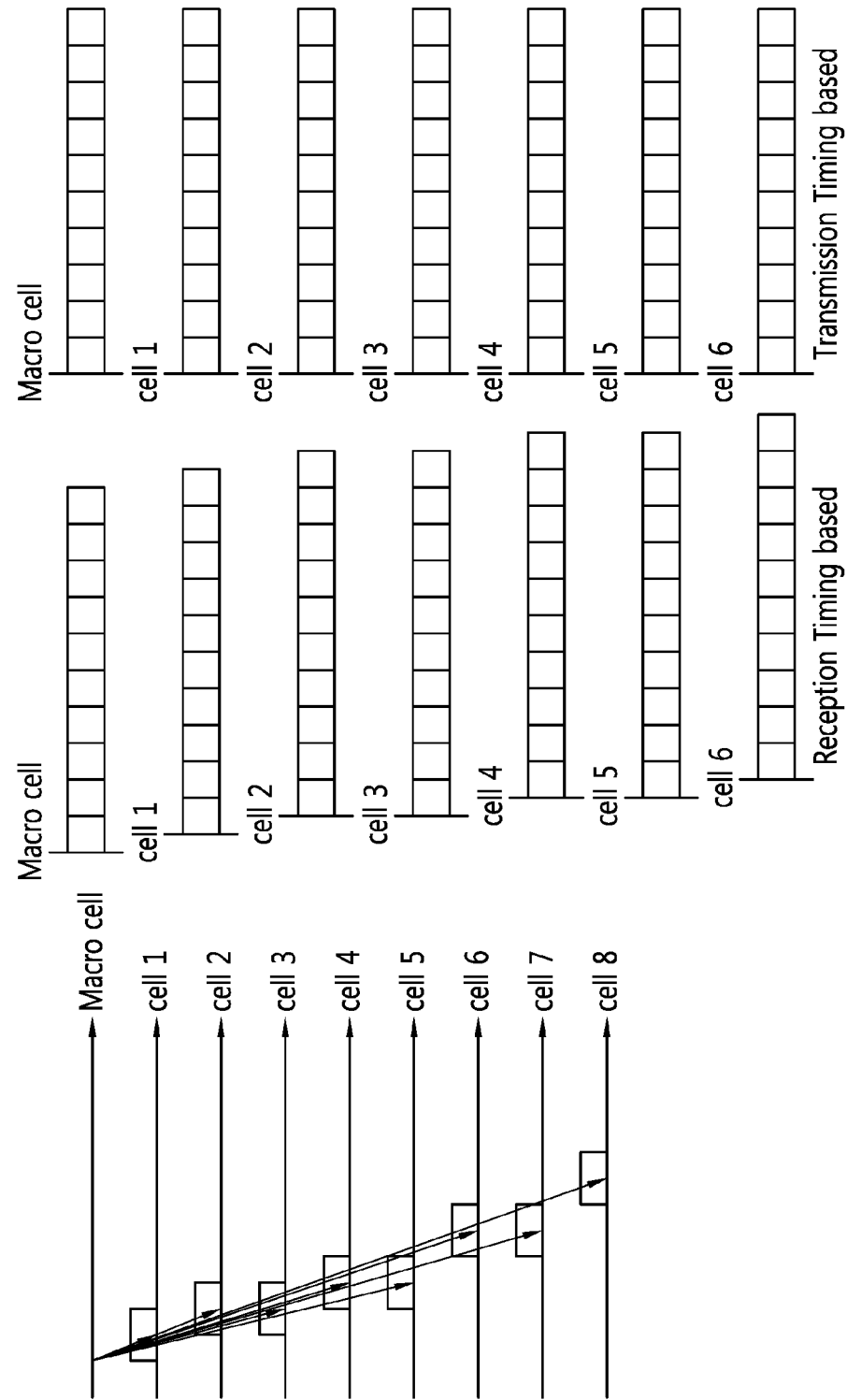
FIG. 10 briefly describes examples of Timing alignment based on propagation delay.

FIG. 10 briefly describes examples of Timing alignment based on propagation delay. The two approaches of network synchronization based on signals from macro cell are (1) receiving timing based alignment and (2) transmission timing based alignment.

First approach is to make transmission timing alignment as shown in the right case of FIG. 10, each small cell once it receives synchronization signal, it needs to transmit uplink signal such as PRACH to macro cell so that macro cell can measure the round-trip time.

Instead of sending PRACH, another approach is a way that small cell can transmit any discovery or network synchronization signals based on received timing of macro-cell synchronization signal and thus macro-cell can calculate the round-trip-delay as shown in the left case of FIG. 10 with the delay propagation of most left of FIG. 10.

Once the macro cell detects the round-trip-delay per each small cell, it may transmit signal of timing adjustment (such as timing advance command) so that small cell can calibrate its timing. This approach, however, requires two-way hand-shaking or small cell synchronization signals so that macro-cell determines the timing. Considering the case where macro cell and small cell layer use separate frequency and thus tight-synchronization among macro and small cells may not be necessary, this approach may not be so efficient.

Moreover, the difference of uplink transmission between two eNBs (when dual connectivity is configured) would be $(TA_{macro}-TA_{small})/2$ whereas receive timing based (one-way synchronization approach) would be $(TA_{macro}-TA_{small})$.

At the same time, reception timing at UE may not be aligned if transmission timing is aligned. Given that small cell uses separate frequency where small cell may be able to listen to macro cell however macro cell may not be able to listen to small cell frequency, two-way hand-shaking approach can be challenging unless small cell may transmit PRACH or other uplink signals (similar to UE).

Figure 11A:
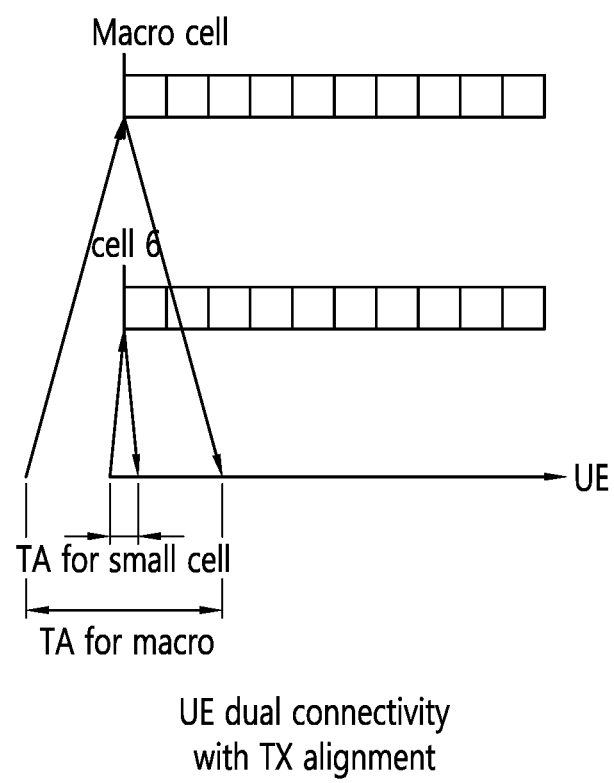
FIGS. 11(a) and 11(b) briefly describe examples of uplink transmission timing relation.
Figure 11B:
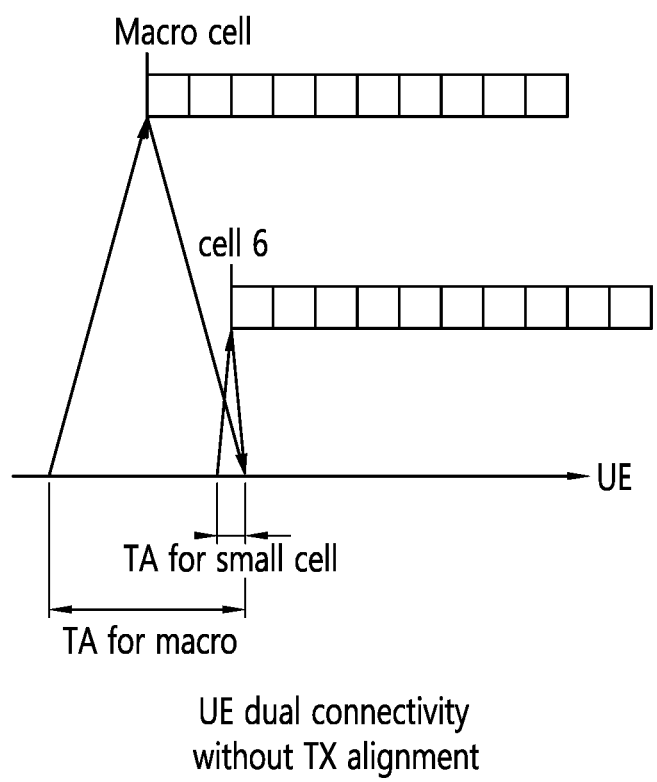

FIGS. 11(a) and 11(b) briefly describe examples of uplink transmission timing relation. FIG. 11(a) illustrates a case of UE dual connectivity with transmission alignment. FIG. 11(b) illustrates a case of UE dual connectivity without transmission alignment.

When small cell layer and macro cell layer use separate frequency, network synchronization among small cells can be also considered.

However, without having many timing source, due to its nature of synchronization error and its propagation effect, making a small cell layer synchronized can be challenging.

When small cells should synchronize each other without macro-assistance, it is proposed to form a cluster or group where time synchronization is performed.

When small cell and macro cell use separate frequency, it may be further discussed as to the design i.e., how to perform one-way network synchronization where small cell listens to macro cell's synchronization signals such as primary synchronization signal (PSS)/secondary synchronization signal (SSS)/CRS and/or discovery signals. PSS and SSS can be also used for cell search as known.

Furthermore, channel state information-reference signal (CSI-RS) can be used. If CSI-RS is used for network listening, we can further consider enlarging the period of CSI-RS transmission more than 80 msec currently specified. Or, a muting pattern can be defined as a subset of CSI-RS or zero power CSI-RS transmission.

For example, a muting pattern may be [0 1 0 0 0 0 0 0 0 0] which means that every 10 times of configured zero power (ZP)-CSI-RS or interference measurement resource (IMR), one muting episode (second occasion) can be assumed. Or, this pattern can be also used for transmission of RS signals as well where each neighboring eNB may mute in those configured transmission time/resource.

Further, assuming a maximum number of clock sources or source eNBs, each eNB may take a turn to transmit synchronization signals which can be determined based on cell ID and stratum level. When IMR configuration is used for muting pattern, to limit the impact on UE, muting is assumed only when muting pattern and MBMS Single-Frequency Network (MBSFN) subframe configuration matches.

For example, IMR for cell synchronization is given for every 5 msec with offset 3, and MBSFN subframe is subframe number 2 (SF#2), only SF#2 in every radio frame will be muted for CSI-RS transmissions. In this way, muting on PDSCH portion can be minimized.

To minimize the impact on Multimedia Broadcast Multicast Services (MBMS) services, the list of "fake MBSFN" subframes can be also exchanged where muting will be occurred only when muting pattern and fake MBSFN pattern matches. In actual MBSFN subframes, muting or actual transmission should not be occurred for MBMS service protection.

Assuming small cell eNB is not capable of supporting dual receptions from both f1 and f2 (for example, f1 for macro layer and f2 for small cell layer), a timing to support uplink frequency switch between f1 and f2 would be required. For example, if small cell and macro cell are both TDD, small cell eNB may be required to perform time-synchronization periodically by acquiring downlink signals from macro cell.

One way is to configure a synchronization gap (similar to UE inter-frequency measurement gap) for each small cell which can be configured by macro-cell or master-cell, or each eNB selects a synchronization gap autonomously where a synchronization gap can be constant value such as 6 msec and occur with periodicity (e.g., 200 msec).

When small cell eNB is in synchronization gap, UE uplink transmission may be disabled by controlling the scheduling or configured by higher-layer signaling. In case the source cell (such as Macro or another small cell) may not transmit synchronization signals such as CRS constantly, the synchronization gap should be aligned with transmission pattern of the source cell.

Also, this synchronization gap can be exchanged among eNBs such that other eNBs may perform muting (other than source cell) to support reliability synchronization signal reception. For this, the information of source cell, transmission pattern of synchronization signals from the source cell, and synchronization gap pattern at the target cell may have to be exchanged among eNBs.

More desirably, this may be also aligned with UEs' measurement gap (if configured) to minimize the service interruption time of the system (e.g., a subset of UEs' measurement gaps).

Figure 12:
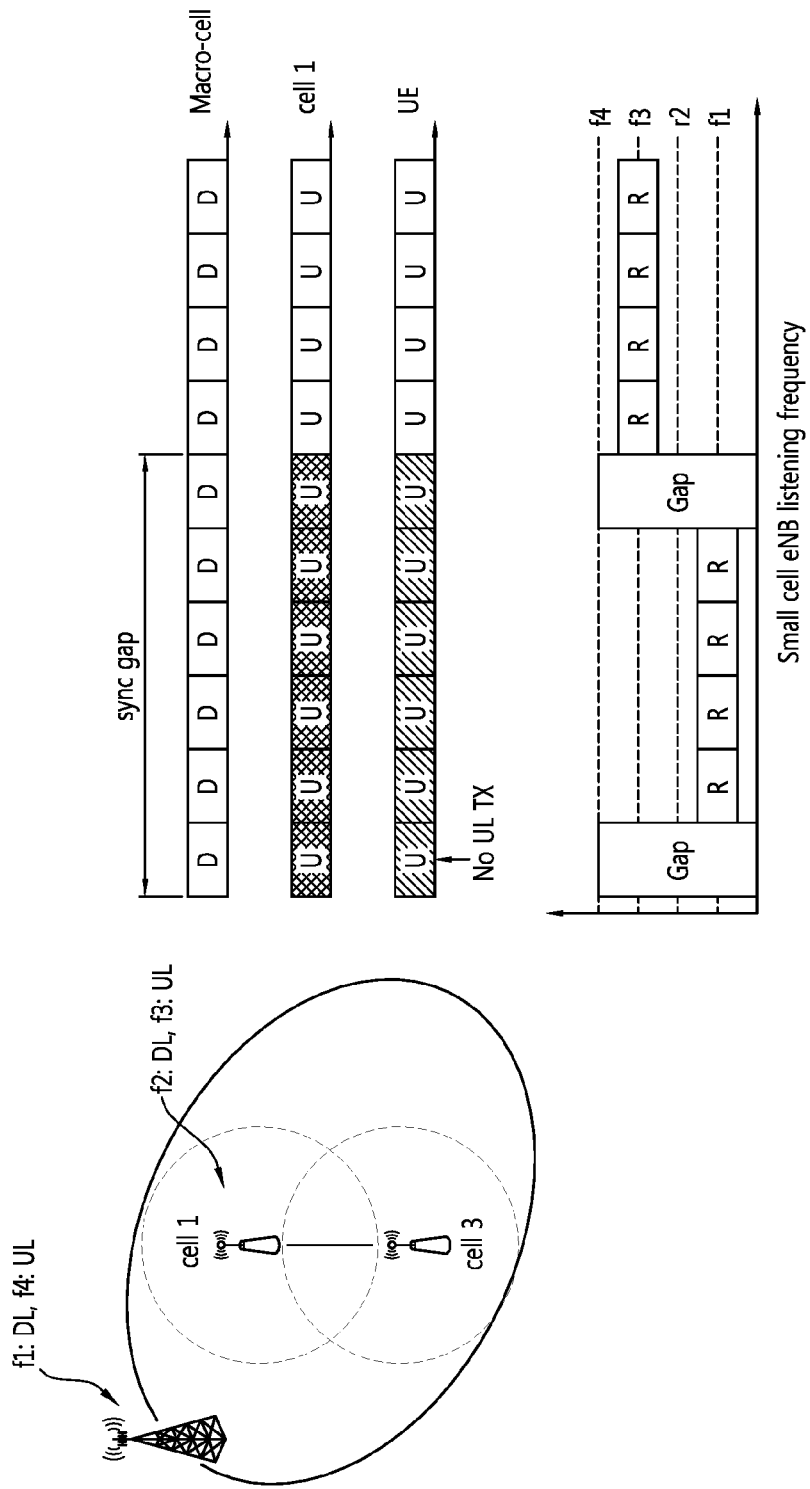
FIG. 12 briefly describes exemplary synchronization gap to acquire synchronization signal from macro cell.

FIG. 12 briefly describes exemplary synchronization gap to acquire synchronization signal from macro cell. Referring to example of FIG. 12, if cell1 performs synchronization by acquiring signals from macro-cell in different frequency, it may perform synchronization gap periodically to listen the signals from macro-cell. The gap (to switch the frequency and other necessary tuning) would be required before and after frequency switch to macro-cell downlink frequency.

Once small cell acquires signals from macro-cell, the small cell has the following options to utilize and synchronize its timing.

(1) Transmission timing: As shown in FIG. 10, transmission timing of small cell can be aligned based on reception timing. In other words, if small cells are performing synchronization based on macro-cell synchronization signal this way, small cells under the same macro coverage may not be aligned in terms of transmission timing which is different based on propagation delay of macro-cell synchronization signals.

If transmission timing alignment is needed, small cell should be able to transmit a signal to macro cell so that macro cell acquires round-trip-time to estimate propagation delay. Or, small cell synchronization without macro-assistance may be used. Or, macro cell may transmit the timing advance values of UEs near the small cell so that it can be used to adjust its transmission timing.

(2) Reception timing: To support efficient dual connectivity, reception timing can be determined based on cases as shown in the later.

(3) Frame boundary: We propose to have separate frame boundary for downlink subframe and uplink subframe. A small cell may maintain different downlink and uplink subframe boundary as illustrated in FIG. 13.

Figure 13:
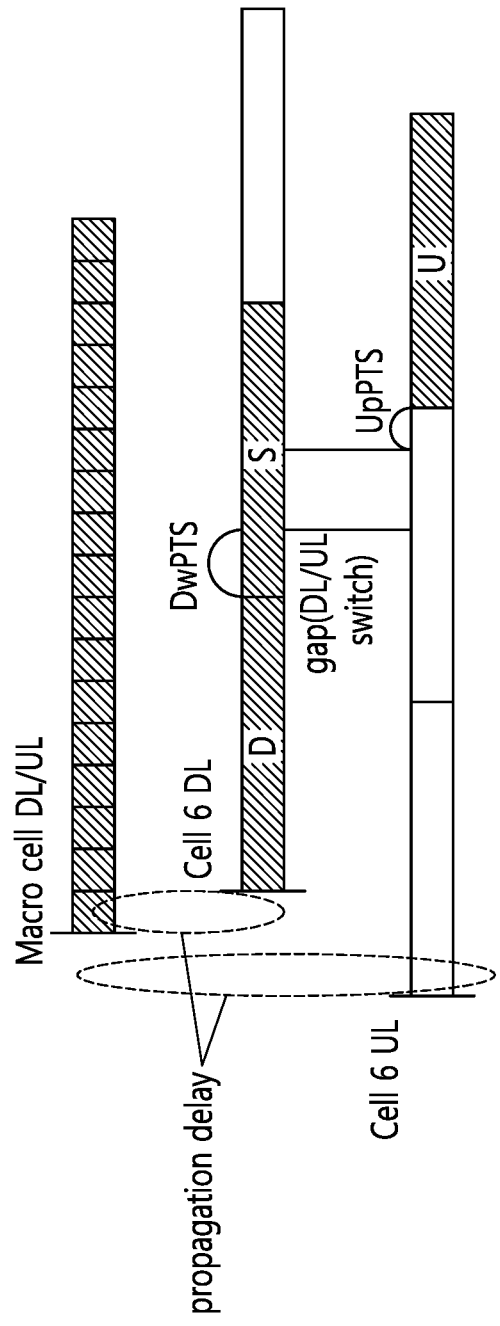
FIG. 13 briefly describes different frame boundary for DL and UL.

FIG. 13 briefly describes different frame boundary for DL and UL. The case of FIG. 13 is an exemplary case with TDD. The benefit of this option is to allow flexible small cell operation to support various scenarios such as dual connectivity and ICIC aspect where TDD is used in small cell layer. For example, the transmission timing difference between PCell and pSCell in dual connectivity is managed within a small value such as [33 µs] as well as the downlink reception timing difference is less than such as 33 µs.

For this, a UE can be configured with "offset" between DL frame boundary and UL frame boundary such that a UE can apply the received TA configuration from the network on timing based on the downlink reception timing+offset.

For example, if downlink reception timing is T1, then apply TA for 4 msec afterwards uplink, (T1+4−offset)−TA becomes uplink starting timing for the 4 msec afterwards uplink transmission.

The same information may be also given to the small cell so that the uplink timing of the small cell can be adjusted. For PRACH, for example, (T1+6−offset) can be used as a uplink transmission timing when PRACH is transmitted at (n+6)th subframe where T1 is the starting time of downlink subframe n. Offset can be signalled via higher-layer signalling such as RRC signaling.

Another approach to perform network synchronization among small cells is to use "discovery signal" transmitted by each small cell.

When a small cell has two clock sources, for one with external aid such as GPS and the other with macro-assisted network listening based synchronization, more accurate clock source may be chosen as the source and can claim itself as a clock source.

If there is at least one neighboring small cell which is clock source, a small cell may perform synchronization using both small cell and macro cell. Or, a macro-cell may configure source which the small cell should use for synchronization.

When both macro cell and small cell are used, timing may not be aligned due to propagation delay from the macro cell.

In this case, the small cell may maintain two-clock synchronizations where one (against macro cell) is used for dual connectivity or other operation collaborating with macro cell and the other is used for ICIC and other collaboration with other small cells. This can be realized also by maintaining separate transmission and reception frame boundary as shown in FIG. 13.

So far, network synchronization to align sub-frame boundary is described. With that issue, how to align radio frame boundary among cells may be a separate issue.

Basic requirement of radio frame boundary alignment is that each cell belonging to a collaboration set may know radio frame boundary of each other. For example, for a dual connectivity or inter-site resource aggregation, a collaborating set includes one macro cell and one small cell.

In this case, both macro cell and small cell know each other's radio frame boundary to support efficient inter-site resource aggregation, in particular, to support a UE with limited capabilities such as single uplink. For ICIC, some techniques to shift sub-frame or shift OFDM symbols may be used to avoid or reduce the interference.

To effectively support, it may be necessary to align radio frame boundary before applying ICIC techniques where radio frame boundary of a clock source can be used as a reference. Or each cell maintains the reference radio frame boundary from a clock source which will be used for reference radio frame boundary to apply any ICIC techniques. Actual application of ICIC will be calculated based on both reference radio frame boundary and actual radio frame boundary.

Figure 14:
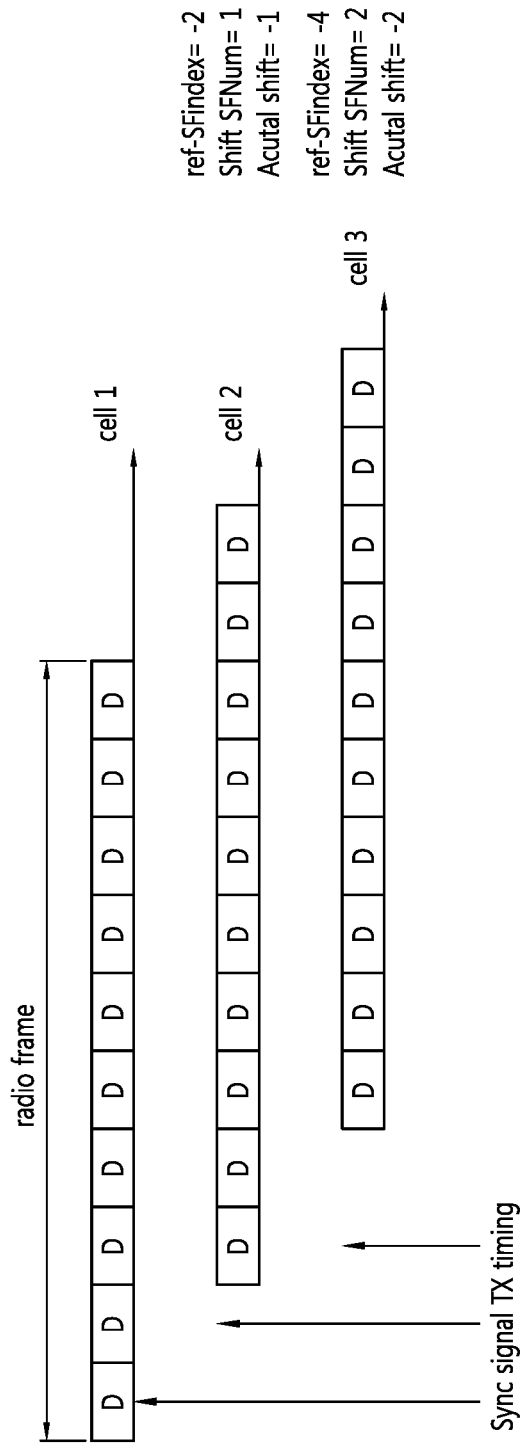
FIG. 14 briefly describes an exemplary case of ICIC frame boundary mis-alignment.

For example, to avoid heavy interference at synchronization signals, each cell uses subframe shift such that each cell shifts (cell ID−1) % N subframes as shown in FIG. 14.

FIG. 14 briefly describes an exemplary case of ICIC frame boundary mis-alignment. As shown in FIG. 14, to align synchronization signal transmission timing as shown in vertical arrows, actual subframe shift can be −1 and −2 for cell2 and cell3 respectively.

For TDD, there could be cases where adjacent frequencies are used by different operators or may operate with different UL/DL configurations. To avoid excessive interference due to UL and DL conflict, it is also desirable to align radio-frame boundary and align UL/DL configurations. In this case, it can be considered that synchronization source or clock source can become a reference so that other eNBs which are synchronizing themselves against the clock source can align its configuration and boundary to the clock source.

Since it affects the associated UE, this procedure will be performed without any associated UEs. Other interference mitigation among adjacent frequency carriers is also feasible if synchronization is not easily achievable or alignment is not efficient. A clock source, thus, should propagate its TDD DL/UL configuration and single frequency network (SFN) along with synchronization signals either via radio interface or backhaul interface. Or, the clock source can also propagate a reference TDD DL/UL configuration and reference SFN which are desired to be used in the cluster/group.

Other eNBs may follow the reference configuration and align its DL/UL configuration to the reference configuration or it may perform necessary power control or ICIC techniques in subframes where conflict between DL/UL occurs between its configuration and reference configuration. This reference configuration can be also used for deciding HARQ-ACK/NACK signaling and other feedback timings.

For discovery signal and efficient hand-over support, SFN may need to be aligned. Similar to frame boundary, each eNB knows each other SFN at least. If needed, each eNB maintains reference SFN from the clock source which will be used for determining SFN for a signal such as discovery signal. Or, it may also be possible to align SFN to the reference.

Figure 15:
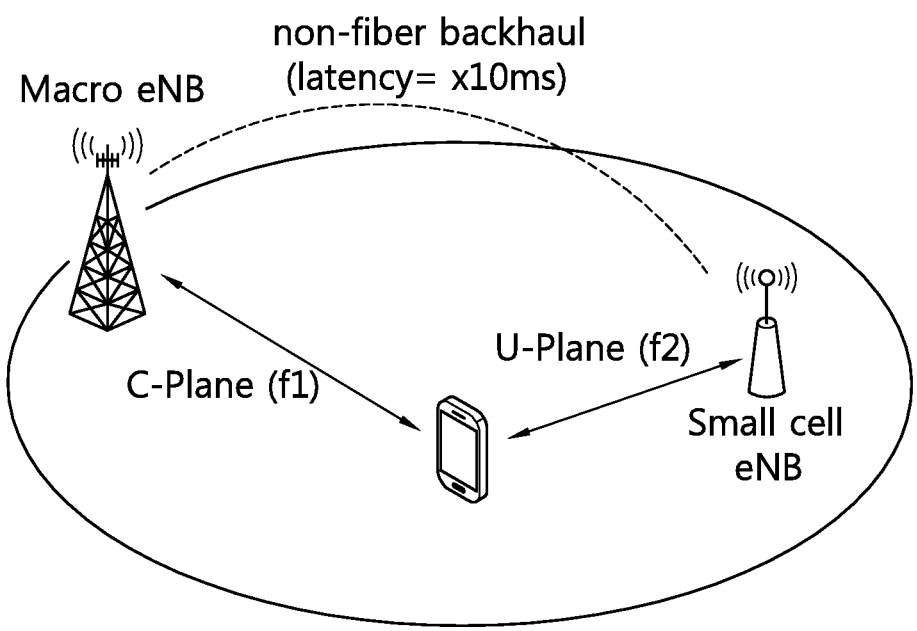
FIG. 15 briefly describes an exemplary case of dual connectivity which needs network synchronization.

Next, potential usage will be described for cases where network synchronization is needed and discuss the synchronization accuracy requirements. The cases are a case of dual connectivity, a case of ICIC, a case of efficient hand-over among small cells, a case of discovery signals, and a case of small cell on/off Case1: Dual Connectivity FIG. 15 briefly describes an exemplary case of dual connectivity which needs network synchronization.

Network synchronization among eNBs which support dual connectivity for a UE may be considered to reduce the complexity of UE transmission related requirements. In terms of supporting dual connectivity with separate frequencies of macro cell layer and small cell layer, three UE capabilities may be considered. (1) Simultaneous UL transmissions to macro cell eNB and small cell eNB and simultaneous DL receptions from macro cell eNB and small cell eNB, (2) simultaneous DL from both macro cell eNB and small cell eNB with single UL to either eNB at one time, and (3) single DL and single UL from either eNB at a time.

To support capability (1), it is desirable from a UE perspective to align uplink transmission timing. From power control and other aspect, it would be good that UE can start two uplink transmissions at the same time.

Figure 16A:
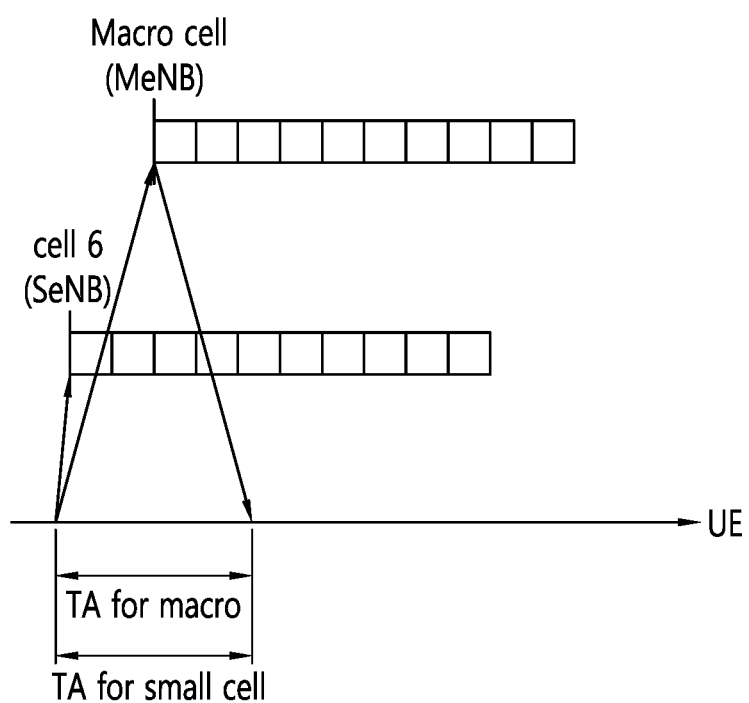
FIGS. 16(*a*) and 16(*b*) briefly describe examples of aligning uplink transmission timing.
Figure 16B:
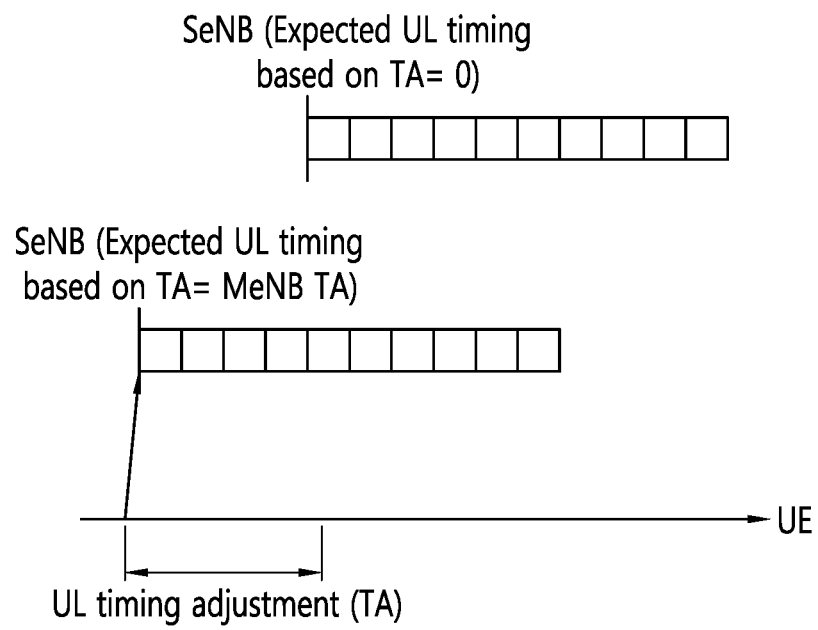

FIGS. 16(a) and 16(b) briefly describes examples of aligned TA between macro cell eNB (MeNB) and small cell eNB (SeNB).

Either with transmission timing alignment or one-way synchronization (where a small cell eNB synchronize with macro-cell based on received timing), a proper timing-advance command can be used to align uplink transmission timing as shown in FIG. 16(a).

Alternatively, a UE can use TA allocated by macro cell (or MeNB) for uplink transmissions to assisting eNB (or SeNB) even for PRACH transmission. For example, as mentioned before, if downlink frame boundary and uplink frame boundary of a small cell is different due to propagation delay from the macro (source cell) based on network listening synchronization, a UE can be configured with "offset" of the frame boundary of DL and UL difference, which will be used for all transmission including PRACH regardless of TA.

For PRACH, since TA is not applied, the timing of PRACH transmission would be (downlink timing of the current subframe−offset). This is to align uplink transmission timing to MeMB and SeNB when simultaneous uplink transmissions occur as illustrated in FIG. 16(b).

When a UE is configured with assisting eNB for inter-site resource aggregation, MeNB may indicate to the UE whether TA configured for MeNB can be used for SeNB as well or not. If the same TA is used (either by configuration or UE assumption) for both MeNB and SeNB so that uplink timing between two transmissions can be aligned, UE shall use the same TA configured by MeNB to SeNB transmission as well. This configuration can be given to SeNB or SeNB may infer the anticipated TA from the UE by measuring propagation delay between MeNB and SeNB or based on TA configured by MeNB. Then, uplink timing of SeNB will be moved to be aligned with UE transmission timing.

When the uplink timing is adjusted, as illustrated in FIG. 13, uplink and downlink frame boundary can be mis-aligned and the gap in TDD should be adjusted accordingly to absorb the TA and UL-DL switching delay. Thus, the gap may be accordingly adjusted based on UE TA assuming small cell coverage is small and within a small cell, TA difference between UE at center and UE at border is small or negligible.

In terms of determining or adjusting the gap duration, a few approaches can be considered. For example, three approaches (i), (ii) and (iii) may be considered.

(i) If SeNB knows the TA value by receiving it from MeNB or based on calculation (assuming TA for the UE and TA for the SeNB is same) where TA for SeNB may be used to align transmission timing, it determines the gap based on known TA value such that the gap can absorb TA+switching delay.

(ii) If SeNB does not know TA value in advance, configure a gap pattern which is signaled by SIB and reconfigure UE-specific manner when TA for each UE is discovered.

(iii) If SeNB does not know TA value in advance, when a UE is configured with SeNB, MeNB signals TA value for the UE to SeNB so that SeNB selects special subframe configuration accordingly which will be signaled to UE via RRC signaling.

When SeNB adjusts its gap pattern, it may reconfigure or change its pattern by updating SIB instead of UE-specific signaling.

To support capability (2), UE may take TDM approach where it switches two frequency of uplink CC dynamically. For this, similar to capability (1), it is desirable to align uplink timing by adapting timing advance properly.

To support (3), UE may take time-division multiplexing (TDM) approach where it switches two frequencies of both downlink and uplink dynamically. Thus, downlink timing alignment would be useful to support this capability. In this case, received timing based (one-way network sync) synchronization would be useful to align down-link reception timing at the UE.

Case2: ICIC

Some ICIC techniques include time and frequency ICIC such as relative narrowband transmit power (RNTP) and almost blank subframe (ABS). Also, OFDM symbol muting or subframe or physical resource block (PRB) muting can be considered as ICIC techniques.

To apply ICIC techniques among cells, each cell should have at least a reference timing. Each cell may be aligned with the reference timing or it maintains two timings. Such as muting technique, cells may not need to be aligned each other as long as each cell knows the timing against the common reference timing when and where to mute. For synchronization signal transmission, however, may require timing alignment such as frame boundary.

Case3: Efficient Hand-Over Among Small Cells

To support efficient hand-over among small cells, one way is to form a small cell cluster which are aligned each other and view as a single cell from a UE perspective. To support this, tight alignment in terms of subframe boundary, frame boundary and SFN would be required. In this case, a clock source or cluster master can be a reference source.

Case4: Discovery Signals

For a power efficient small cells discovery, small cells may align its timing to transmit discovery signals. For example, if small cell transmits discovery signal every 200 msec, small cells align its transmission timing so that a UE can discover multiple cells by reading one subframe. In this case, each small cell maintains a reference SFN from a clock source or macro cell or cluster head or any other representative node which will be used to calculate the timing to transmit discovery signal.

Case 5: Small Cell on/Off

When small cell on/off is applied, to support legacy UEs, efficient wake-up procedure would be necessary. To reduce unnecessary interference and allow more cells to keep off state, it is important to select the minimum number of potential cells to wake up so that a legacy UE can measure and be attached.

One approach is to make SeNBs to listen to UE uplink signals (to MeNB) to measure/estimate UE proximity and cells within its proximity will be woken up. This approach however requires SeNB listening UE uplink signals and thus need to know uplink signal configuration and resource information which may be dynamically changed.

Alternative approach is to use "measurement gap" of UEs to transmit measurement signals such as PSS/SSS/CRS.

Another example to utilize timing advance of macro cell is to select target small cells to wake up. Based on UE TA and propagation delay measured and/or reported for each small cell can be used to determine the set of cells to wake up to aid UE measurement in particular for legacy UEs which may not be able to exploit discovery signals. Meanwhile, to support network synchronization, X2 (or Xn) signalling can be enhanced. X2 is an interface between eNBs as described above. Xn in an interface between eNBs and may be used for dual connectivity. Hereinafter, X2 (or Xn) signalling enhancement is described.

When an eNB may not be able to meet the synchronization requirement (e.g., propagation delay+1.33 µs) due to some potential reasons (such as there is no near-by clock source and thus multi-hop propagated synchronization error exceeds the requirement e.g., stratum level>3), it needs to report "asynchronous" status. Currently, 3GPP TS 36.413, the following X2 information element (X2 IE) is defined.

The Time Synchronization Info IE is used for signalling stratum level and synchronization status for over-the-air synchronization using network listening. Table 1 is an example of synchronization info IE.

TABLE 1

| IE/Group Name | Presence | Range | IE type and reference | Semantics description |
| --- | --- | --- | --- | --- |
| Synchronization Info | | | | |
| >Stratum Level | M | | INTEGER (0 . . . 3, . . .) | |
| >Synchronization status | M | | ENUMERATED (Synchronous, Asynchronous, . . .) | |

The invention(s) in this application for X2 (or Xn) interface proposes to add "accuracy level" which can further classify synchronous and asynchronous states.

For example, an accuracy level can include INTEGER (0 . . . 7) where each value means the followings as an example shown in the table 1. This information can be used by other nodes to calculate its timing accuracy compared to the clock source.

Alternatively, stratum level may be used for indicating accuracy level as well. For example, accuracy level 3 maps to stratum level 3 and accuracy level 2 maps to stratum level 2 and so on.

How to determine stratum level may be up to eNB implementation. Yet, the mapping table where each eNB can assume in terms of synchronization error achievable needs to be specified. This specification is necessary to determine the state of synchronous or asynchronous if there is a target requirement to meet. Table 2 is an example of accuracy mapping table.

TABLE 2

| Accuracy Level | |
| --- | --- |
| 0 | Clock source (less than ~100 ns) Synchronous |
| 1 | Accuracy within ±1 us Synchronous |
| 2 | Accuracy within ±1.5 us Synchronous |
| 3 | Accuracy within ±3 us Synchronous |
| 4 | Accuracy within ±6 us Asynchronous |
| 5 | Accuracy within >= ±10 us Asynchronous |

Optionally whether an eNB has achieved synchronization or not can be confirmed by a source eNB which is the source for network synchronization for the target eNB.

Thus, definition of stratum level to potentially synchronization error needs to be clearly specified if stratum level does not mean "hop-count". When an eNB receives stratum level 1, the eNB determines its stratum level using both its signal-to-interference-and-noise ratio (SINR) (and thus achievable synchronization error) and the received stratum level.

In other words, stratum level may be updated based on synchronization accuracy achieved. Furthermore, stratum level needs to be measured over at least a few synchronization samples. Dynamic change of stratum level may cause system instability and thus it is desirable for an eNB to perform at least a few episodes of network listening before deciding its accuracy. Thus, overall periodic or aperiodic measurement and synchronization process may be specified.

This information can be used to select a source eNB when a target eNB has multiple potential source eNBs. In terms of selecting the source eNB, both SNIR and accuracy level of source eNBs can be used. This can be used in conjunction with stratum level or the number of hops.

For example, SINR should exceed a threshold and then a eNB with the highest accuracy level (i.e., lowest error) can be chosen. Or a function combined of both SINR and accuracy can be used to determine the source eNB.

Also, if the source cell performs cell on/off, this information can be used to determine the source eNB as well. Also, each eNB may propagate the number of decedents who have selected the eNB as a source/donor eNB for their network synchronization.

This information can be used by other eNBs to select a source eNB as well such that a eNB with the largest number of decedents may be selected as a source eNB with higher probability given that the same stratum level and acceptable link quality.

To measure synchronization accuracy or error, each eNB may need to perform cell-to-cell measurement to map the received SINR to the achievable accuracy. For example, synchronization and measurement on SINR may be occurred over multiple subframes, and then it can be used for determining error level. One example of measurement is to reuse reference signal received power (RSRP) and received signal strength indicator (RSSI) used for UE measurement where RSRP can be measured from RS used for network listening.

In terms of measuring interference, either IMR-like muting REs can be used or interference can be estimated over the OFDM symbols carrying synchronization signals. The configuration of this RS can be informed or configured among cells. The signaling is necessary as each eNB should know when and how many subframes this eNB can use for its accurate measurement. The requirement on measurement is also necessary (in terms of accuracy, latency, etc).

In addition, the invention(s) of this application also proposes to send "propagation delay" of each cell which is synchronous if the propagation delay between the clock source and itself is known. If propagation delay is not known, it may send the clock source ID so that other cells which use the cell as for clock synchronization may infer the propagation delay.

When there is no sufficient clock source in the network, using network listening techniques, there could be cells which may not be tightly synchronized to meet the requirement. In this case, those cells would report their status to asynchronous with accuracy level calculated based on accuracy level of the source eNB and its HW power or implementation error range.

For example, if a source eNB reports accuracy within ±3 µs and the target eNB has 1.33 µs implementation margin, the accuracy becomes ±4.33 µs which could not meet the requirement. In this case, even though a cell can loosely synchronize with other cells, it may not claim itself as synchronous eNB.

To support efficient UE reception, particularly, for interference cancellation, discovery signal transmission, etc, this eNB may choose extended cyclic prefix (CP) to be used in the network. Neighbor eNBs can also change its CP to extended CP to align the reception timing at UEs. To support this, X2 signaling to exchange its CP length can be supported. Moreover, an eNB which cannot find a clock source supporting synchronization of the target eNB to meet the synchronization requirement, may report "radio synchronization failure indication" back to the control eNB or macro-eNB, or exchange the information via X2/Xn signaling.

When this indication is reported, the reason of radio synchronization failure (RSF) can be also transmitted. For example, potential reasons of RSF include (1) RSF due to low SNIR/SNR, (2) RSF due to too large stratum level, (3) RSF due to too high inaccuracy, (4) RSF due to source eNB failure, etc.

When this reason is propagated, other eNBs may take appropriate actions such as for low SNIR/SNR, neighbor source eNBs may increase the synchronization signal transmission power or perform inter-cell coordination to improve SNIR/SNR on the cell.

One example of action can include activation of muting where a muting pattern is given/exchanged via X2/Xn signaling which can be activated via radio-interface. Once the muting is activated, each eNB follows muting pattern to allow better SINR for eNBs which are not able to synchronize themselves.

Another potential action would be to reform clusters or create/partition groups/clusters and then allocate more clock sources (which may not be synchronized against GPS) either based on synchronization with macro cell or other means.

Those "virtual" clock sources may not be aligned each other and thus inter-group or inter-cluster synchronization may not be supported in this case. Different from a clock source, this node can be called "virtual" clock source. Indication of a virtual clock source can be separate from clock source using different signals or IDs or different stratum level.

To determine whether an eNB can perform radio-based synchronization or not, a requirement may be necessary such as eNB should be able to acquire synchronization signals from neighboring eNB with MATH 1.

$$E_c/I_o \geq -k \text{ dB (e.g., } k=6\text{),} \qquad \text{<MATH 1>}$$

where $E_O$ is the signal strength and $I_O$ is the noise and interference.

Another potential signaling would be reports of "corrected synchronization error and the period of synchronization correction".

For example, if a clock source or the source eNB performs cell on/off and thus clock synchronization signals are transmitted rather periodically, target eNBs may correct its timing periodically. If synchronization signals are transmitted continuously, target eNB may adapt its correction period according to its correction amount (or its sync error).

However, if the source cell periodically transmits synchronization signal or if transmission power of synchronization signal can be adapted, the information of accuracy and correction level of a target eNB and the interval between synchronization correction episodes could be useful to determine the source eNB's power level or periodicity of synchronization signals.

In addition, each eNB may exchange the information of a selected source eNB ID so that the source eNB can also perform measurement on the target eNBs.

Figure 17:
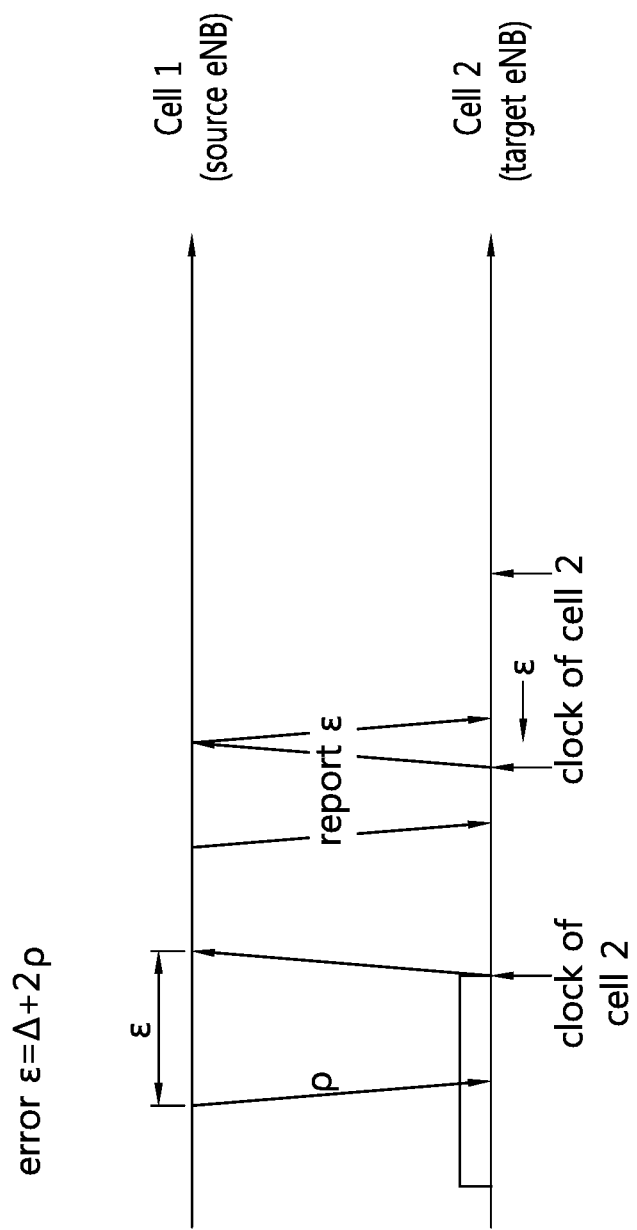
FIG. 17 describes briefly an example of the calibration.

FIG. 17 describes briefly an example of the calibration. Referring to FIG. 17, the example of FIG. 17 describes a case of clock error calibration by two-way exchange. Once a source cell may calculate potential synchronization error, the value can be informed to the target eNB to calibrate its synchronization error. In FIG. 17, the error ε is reported to the target eNB when the source eNB calculates the error ε.

Also, the information of clock source ID and source eNB ID and stratum level can be used for determining whether two eNBs can be synchronized or not. When an eNB determines a set of eNBs which are overlapped coverage with itself. For each eNB with overlapped coverage, the eNB computes whether it is synchronized to the target eNB or not based on stratum level, accuracy, and/or the source eNB ID, and/or the clock source ID reported by the target eNB.

If two eNBs share the same source eNB, then it can safely assume that two eNBs are synchronized as long as the accumulated error does not exceed a threshold. If the source eNB is different, the potentially accumulated synchronization error ERR would be derived as MATH 2.

$$ERR = (\text{stratum\_level of first } eNB) * \text{maximum\_allowed\_sync\_error\_per\_hop} + (\text{stratum\_level of second } eNB) * \text{maximum\_allowed\_sync\_error\_per\_hop} \qquad <\text{MATH 2}>$$

Here, maximum_allowed_sync_error_per_hop is maximum allowed synchronization error per a hop and stratum level of the first eNB and the second eNB which can be determined by signaling or mapping table.

If ERR does not exceed a certain threshold, two eNBs may assume they are synchronized. Otherwise, it may not assume that.

Since each eNB may have synchronized neighbors as well as non-synchronized neighbors, it reports not only the status of synchronous or not (which may be determined based on network listening from a selected source eNB or configured source eNB) and also report the status to each neighboring eNB (whether it is synchronized to a neighbor eNB or not).

In this report, the potential synchronization error between itself and the target eNB based on estimation (from synchronization error and propagation delay estimation) may be also reported. This can be exchanged among eNBs or sent to macro or master eNB.

In terms of supporting currently specified stratum level and synchronization state, each eNB can inform "stratum level" if the eNB can be synchronized against a clock source. In this case, the eNB can claim itself as "synchronized". In this case, the state with each coverage overlapped eNB can be separately signaled.

The final state of synchronous and asynchronous can be indicated back to control eNB or macro eNB. When it determines synchronization state to the coverage overlapped eNBs, the list of eNBs can be configured to each eNB for checking the state.

In this case, the state for each eNB can be sent back to the controller which initially configured the list. Or, an eNB may determine the list of coverage overlapped eNBs based on measurement/cell discovery and cluster information. Unless configured otherwise, an eNB may assume all eNBs discovered (within SINR requirement) as overlapped eNBs. Or, it may assume that eNBs within the same cluster may be assumed as overlapped eNBs if cell discovery procedure also allows to identify the cluster ID. Or, an eNB may assume the list of eNBs which its associated UEs report in their measurement (e.g., RRM measurement) as overlapped eNBs.

The information of synchronization state between each pair of eNBs can be useful to determine clusters/groups where each group contains a set of eNBs which can be synchronized each other. Or, the information can be used by macro eNB to determine a set of clock sources which will perform network synchronization against the macro cell.

The measurement reports between eNBs can be also used for selecting and reconfiguring the clusters/groups as well. Thus, it may be required for each eNB sends its measurement report to either controlling eNB or macro eNB. The measurement configuration (period, threshold, the list of target eNBs, . . . ) may be configured by controlling eNB or macro eNB as well.

For example, in FIG. 7, it may be assumed that two clock sources are available (cell 1 and cell 8). For cell 5, it can receive synchronization signal started from cell1 with stratum level 2 or started from cell8 with stratum level 2.

When a cell receives two signals, the cell may determine which cell to synchronize against. To determine the donor eNB, cluster ID can be used. A cell with the same cluster ID may be assumed as a valid donor eNB.

In other words, a cell may not attempt to synchronize with other eNBs if the cell belongs to different clusters. Alternatively, a controlling eNB or macro eNB may indicate which clock source each eNB should use. So that each eNB selects the source eNB configured. In the example of FIG. 7, if cell 5 is configured with clock source of cell 1, it will synchronize itself by listening on cell 2.

In general, it may be necessary to determine which eNBs should be used for network synchronization by each eNB if network listening is used.

In this example of FIG. 7, cell 5 (stratum level 2 from cell 1) and cell 6 (stratum level 1 from cell 8) may or may not be synchronized each other depending on the maximum allowed synchronization error per each hop. The maximum error between two cells $E_{MAX}$ would be MATH 3.

$$E_{MAX} = 2*\Delta + 1*\Delta, \qquad <\text{MATH 3}>$$

where Δ is the maximum allowed synchronization error per each hop.

Furthermore, when small cells perform cell on/off, a cell chosen as clock source may not perform cell on/off regardless of configuration. Or, it may determine the periodicity of synchronization signals such that it will transmit synchronization signals with that periodicity regardless of cell on/off.

In summary, a list of potential parameters which can be added to exchange synchronization state is as follows:

(1) source eNB ID: The source eNB with which this eNB has used for network synchronization based on network listening. If the source eNB is clock source, source eNB ID is same to clock source ID.

(2) the list of neighboring eNBs and the state of network synchronization with each one: Either configured or discovered, for each neighboring eNB, the state on network synchronization can be delivered. Additionally, the stratum level between two eNBs or synchronization accuracy level can be exchanged.

(3) Timing advance or propagation delay: If macro eNB is a clock source, maximum propagation delay which should be considered in accuracy calculation (or to determine how much timing difference is there) can be also sent. Depending on the clock source type, this information can be simplified such as for a macro cell with coverage less than 500 m, the maximum propagation delay is 1.77 µs, for a macro cell with coverage equal to or larger than 500m, the maximum propagation delay is up to 13 µs, for a small cell with number of hops equal to or less than 5, the maximum propagation delay is 1.77 µs, and for a small cell with the number of hops equal to or larger than 5, the maximum propagation delay is 13 µs.

In other words, in small cell network synchronization, propagation delay can be estimated using the number of hops that network listening based signals were propagated, and network listening with macro-assisted synchronization, the propagation delay is assumed as maximum depending on cell range.

Thus, if a small cell is a clock source, the number of hops (if stratum is not used to specify the number of hops) would be additionally propagated as well. If this is the case, the maximum propagation delay per each hop (e.g., 0.3 µs) can be assumed.

Additionally, each eNB is required to perform measurement to accurately estimate the synchronization error. This information can be sent to other eNB(s) if requested or configured.

If there is a macro eNB or controlling eNB, the list of neighboring eNBs or the topology of cluster or interference map can be sent to each eNB so that it can determine a set of coverage overlapped eNBs or eNBs which it needs to check the state of synchronization.

Figure 18:
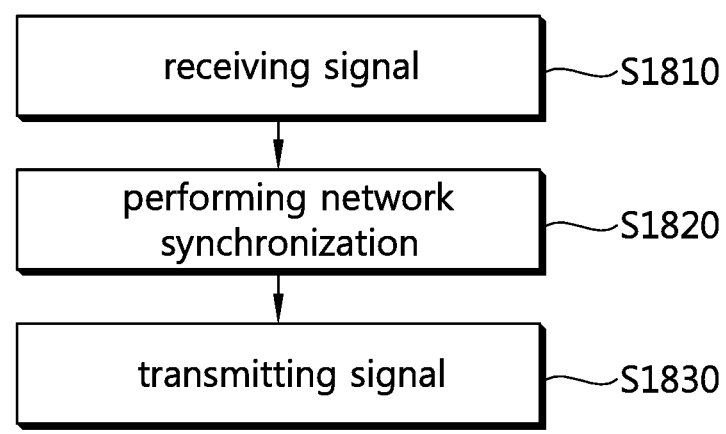
FIG. 18 is a flow chart describing an operation of eNB according to present invention(s) briefly.

FIG. 18 is a flow chart briefly describing operation of eNB according to the present invention(s).

Referring to FIG. 18, the eNB receives signal from UE and/or a cell at step S1810. The eNB may operates under dual connectivity. The eNB may communicate with other cell (other eNB) via interface such as X2 or Xn.

The signal from UE or cell may be round trip signal and the signal to UE or cell may be synchronization signal. The signal and its receiving process are same as explained before in this application.

The eNB performs network synchronization with neighboring cells at step of S1820. The network synchronization can be performed based on received signal.

The eNB may derive information needed for network synchronization based on measurement with received signal. In addition, the information needed for network synchronization may be signaled by higher level signaling or signaled via X2 (or Xn).

The details on network synchronization are same as explained before in this application.

The eNB transmits signal to the user equipment and or the cell at step of S1830. The eNB may transmit signal at the timing adjusted based on network synchronization, and then the eNB also may receive signal at the timing adjusted based on network synchronization.

The details are also already explained before in this application.

Figure 19:
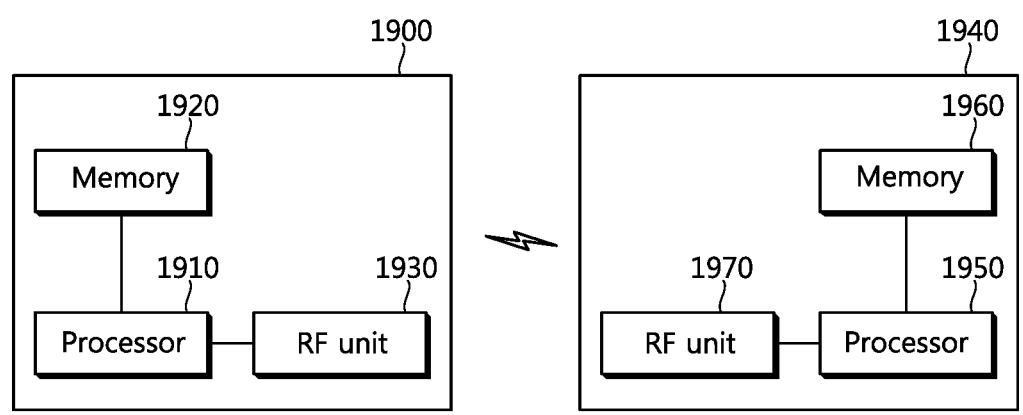
FIG. 19 is a block diagram for the system according to the present invention(s).

FIG. 19 is a block diagram which briefly describes a wireless communication system including an UE 1900 and a BS (eNB) 1940. The UE 1900 and the BS 1940 may operate based on the description as explained above.

In view of downlink, a transmitter may be a part of the BS 1940 and a receiver may be a part of the UE 1900. In view of uplink, a transmitter may be a part of the UE 1900 and a receiver may be a part of the BS 1940.

Referring to FIG. 19, the UE 1900 may include a processor 1910, a memory 1920 and a radio frequency (RF) unit 1930.

The processor 1910 may be configured to implement proposed procedures and/or methods described in this application. For example, the processor 1910 may adjustment transmission and/or receiving timing based on information derived by measuring or received via signaling. The processor may adjust the boundaries of UL subframe(s) and DL subframe(s) to be different based on timing advance offset received from BS (eNB). The details are same as described before.

The memory 1920 is coupled with the processor 1910 and stores a variety of information to operate the processor 1910, which includes data information and/or control information. The RF unit 1930 is also coupled with the processor 1910. The RF unit 1930 may transmit and/or receive a radio signal.

The BS 1940 may include a processor 1950, a memory 1960 and a RF unit 1970. Here, the BS may be PCell or SCell and the BS may be a macro cell or small cell. In addition the BS may be a source cell for network synchronization or a target cell for network synchronization.

The processor 1950 may be configured to implement proposed procedures and/or methods described in this application. For example, the processor 1950 may perform network synchronization with neighbouring cells. The processor 1950 may transmit/receive signal needed for network synchronization via the RF unit 1970. The processor 1950 may perform measurement for deriving information needed for network synchronization. The details are already described before in this application.

The memory 1960 is coupled with the processor 1950 and stores a variety of information to operate the processor 1950, which includes data information and/or control information. The RF unit 1970 is also coupled with the processor 1950. The RF unit 1970 may transmit and/or receive a radio signal. The signals transmitted or received via the RF unit 1970 are also described before.

The UE 1900 and/or the BS 1940 may have single antenna or multiple antennas. The wireless communication system may be called as MIMO system when at least one of the UE 1900 and the BS 1940 has multiple antennas.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. An apparatus for network synchronization, the apparatus comprising:
 a transceiver; and
 a processor that:
  controls the transceiver to receive a channel state information-reference signal (CSI-RS) according to a muting pattern from a macro cell,
  wherein the macro cell and the apparatus use separate frequencies;
  performs network synchronization with the macro cell based on the CSI-RS,
  applies a frame boundary offset between a downlink subframe and an uplink subframe,
  wherein the frame boundary offset is an interval by which the downlink subframe and the uplink subframe are separated, and
  controls the transceiver to transmit a signal by setting a start time for an uplink transmission based on the frame boundary offset and a timing advance (TA) received from a network,
  wherein the frame boundary offset is configured based on higher layer signaling,
  wherein the downlink subframe and the uplink subframe are time division duplex (TDD) subframes, and
  wherein the muting pattern matches a fake MBMS Single-Frequency Network (MBSFN) subframe pattern.

2. The apparatus of claim 1, wherein the processor further:
 controls the transmitter and the receiver to transmit a synchronization signal and receive a round-trip signal as a response to the synchronization signal,
 measures round trip time based on the round-trip signal, and
 controls the transmitter to transmit information on a timing adjustment when a round trip delay is determined from the round trip time measurement.

3. The apparatus of claim 2, wherein the round-trip signal is received on a random access channel.

4. The apparatus of claim 3, wherein the processor controls the transmitter to transmit information on a timing advance offset to a user equipment, and
 wherein the random access channel is transmitted from the user equipment using the timing advance offset.

5. The apparatus of claim 1, wherein the processor further:
 controls the transceiver to periodically transmit information on a synchronization gap pattern, and
 configures the synchronization gap pattern to be aligned with a transmission pattern of a source cell.

6. The apparatus of claim 1, wherein the processor further:
 controls the transceiver to periodically receive information on a synchronization gap pattern, and
 controls the transceiver to transmit a signal based on the synchronization gap pattern which is aligned with a transmission pattern of a source cell.

7. The apparatus of claim 1, wherein the processor synchronizes with a clock source so as to align a boundary of the downlink or uplink subframe with a boundary of a subframe of the clock source.

8. The apparatus of claim 1, wherein the processor further:
 controls the transceiver to receive information on a timing advance from a user equipment, and
 determines cells to wake up based on the timing advance of the user equipment and a propagation delay for each cell.

9. The apparatus of claim 1, wherein the processor further determines whether the apparatus is synchronized with a second apparatus when a coverage of the apparatus overlaps with a coverage of the second apparatus.

10. The apparatus of claim 9, wherein the processor further determines that the apparatus is synchronized with the second apparatus when the apparatus and the second apparatus share a source cell and an accumulated synchronization error does not exceed a threshold.

11. The apparatus of claim 10, wherein the accumulated synchronization is derived based on synchronization error per hop.

12. A method for network synchronization by a small cell, the method comprising:
 receiving a channel state information-reference signal (CSI-RS) according to a muting pattern from a macro cell,
 wherein the macro cell and the small cell use separate frequencies;
 performing network synchronization with the macro cell based on the CSI-RS;
 applying a frame boundary offset between a downlink subframe and an uplink subframe,
 wherein the frame boundary offset is an interval by which the downlink subframe and the uplink subframe are separated; and
 transmitting a signal by setting a start time for an uplink transmission
 based on the frame boundary offset and a timing advance (TA) received from a network,
 wherein the frame boundary offset is configured based on higher layer signaling,
 wherein the downlink subframe and the uplink subframe are time division duplex (TDD) subframes, and
 wherein the muting pattern matches a fake MBMS Single-Frequency Network (MBSFN) subframe pattern.

13. The method of claim 12, wherein receiving the signal includes receiving a round-trip signal as a response to a synchronization signal,
 wherein performing the network synchronization includes measuring round trip time based on the round-trip signal, and
 wherein transmitting the signal includes transmitting information on a timing adjustment when a round trip delay is determined from the round trip time measurement.

14. The method of claim 13, wherein the round-trip signal is received on a random access channel.

* * * * *